US012126132B2

(12) United States Patent
Skolozdra et al.

(10) Patent No.: US 12,126,132 B2
(45) Date of Patent: Oct. 22, 2024

(54) ISOLATING GROUND SWITCH

(71) Applicant: Hubbell Incorporated, Shelton, CT (US)

(72) Inventors: Stephen Andrew Skolozdra, Terryville, CT (US); John Kenneth Carrozzo, Jr., Torrington, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/490,920

(22) Filed: Sep. 30, 2021

(65) Prior Publication Data

US 2022/0102877 A1 Mar. 31, 2022

Related U.S. Application Data

(60) Provisional application No. 63/085,634, filed on Sep. 30, 2020.

(51) Int. Cl.
*H01R 9/24* (2006.01)
*H01R 4/38* (2006.01)

(52) U.S. Cl.
CPC ............ *H01R 9/2433* (2013.01); *H01R 4/38* (2013.01); *H01R 9/2483* (2013.01); *H01R 9/2491* (2013.01)

(58) Field of Classification Search
None
See application file for complete search history.

(56) References Cited

U.S. PATENT DOCUMENTS

| | | | | |
|---|---|---|---|---|
| 1,537,272 | A | 5/1925 | Sweet | |
| 3,800,106 | A * | 3/1974 | Simmons | H01H 19/58 200/554 |
| 4,779,305 | A | 10/1988 | Gorsek | |
| 7,429,710 | B2 | 9/2008 | Gutalj | |
| 7,462,061 | B2 | 12/2008 | Balfour | |
| 8,647,159 | B2 | 2/2014 | Steeves | |
| 9,728,354 | B2 | 8/2017 | Skolozdra | |
| 2007/0158311 | A1 | 10/2007 | Suzuki | |
| 2011/0108398 | A1 | 5/2011 | Nitert | |
| 2011/0250771 | A1 | 10/2011 | Suzuki | |
| 2015/0144468 | A1 | 5/2015 | Skolozdra | |
| 2016/0042892 | A1 | 2/2016 | Senne | |
| 2021/0407749 | A1 | 12/2021 | Widtmann | |

FOREIGN PATENT DOCUMENTS

| | | |
|---|---|---|
| CA | 2871238 | 5/2018 |

OTHER PUBLICATIONS

International Search Report and Written Opinion mailed in corresponding PCT/US2021/052960 on Dec. 27, 2021 (11 pages).
EMC Brochure, “Isolating Ground Switch-Test Station”, 2016 (2 pages).
International Preliminary Report on Patentability mailed in corresponding PCT/US2021/052960 on Apr. 13, 2023 (10 pages).

* cited by examiner

*Primary Examiner* — Felix O Figueroa
(74) *Attorney, Agent, or Firm* — Wissing Miller LLP

(57) ABSTRACT

A device assembly capable of selectively bonding one or more tracer wires to ground and isolating the one or more tracer wires from ground is provided. The device assembly includes a housing, an electrical switch within the housing and one or more contact assemblies. The one or more tracer wires and ground wire are connected to the one or more contact assemblies. The electrical switch can connect the tracer wires to the ground wire and can isolate the tracer wires from the ground wire.

19 Claims, 11 Drawing Sheets

ISOLATING GROUND SWITCH

CROSS-REFERENCE TO RELATED APPLICATIONS

The present disclosure is based on and claims benefit from U.S. Provisional Patent Application Ser. No. 63/085,634 filed on Sep. 30, 2020 entitled "Isolating Ground Switch" the contents of which are incorporated herein in their entirety by reference.

BACKGROUND

Field

The present disclosure relates generally to devices for bonding and isolating electrical conductors. More particularly, the present disclosure relates to improved devices for bonding one or more tracer wires and selectively isolating the tracer wires from electrical ground.

Description of the Related Art

Tracer wires are used when underground objects that are not electrically conductive need to be located after being buried. Such electrically non-conductive objects include plastic water, electric, gas and sewer pipes, cement sewer pipes and fiber optic cables. Since electrically non-conductive underground objects are difficult to detect and locate from above the ground, an electrical conductor, such as a tracer wire, is laid alongside the electrically non-conductive underground objects while they are being buried. Knowing the existence of a tracer wire in proximity to an electrically non-conductive underground object allows technicians to locate the electrically non-conductive underground object by passing electrical current through the tracer wire and sensing the electrical field with an above ground detector, or by detecting the presence of the metallic cable forming the tracer wire.

It is common to electrically bond such tracer wires at a terminal located at or in utility marker posts, pedestals, cabinets, manholes, vaults and enclosures. In order to pass an electrical current through bonded tracer wires, it is necessary to electrically isolate the tracer wires from a ground wire bonding the tracer wires. The present disclosure provides an improved terminal for bonding tracer wires and for isolating the tracer wires from a ground wire when applying an electrical current to the tracer wire in order to locate the electrically non-conductive underground objects.

SUMMARY

The present disclosure provides exemplary embodiments of wiring device assemblies that can be switched between a ground (or normal) position and an isolation position, and to test stations that include an enclosure to house one or more tracer wires and wire device assembly. The wiring device assemblies may be used for various applications. In one non-limiting example, the wiring device assemblies may be mounted to an enclosure or other structure, such as a marker test station or marker post. The wiring device assemblies may be used to electrical ground or bond one or more tracer wires when in the ground position, and to isolate the one or more tracer wires from the electrical ground when switched to the isolation position. When in the isolation position, the one or more tracer wires are isolated from the electrical ground so that an electrical current may be applied to the tracer wire for locating underground electrically non-conductive objects by detecting the tracer wire with the electrical current applied thereto.

In an exemplary embodiment, the wiring device assembly includes a base, an electrically conductive plate, one or more terminal contact assemblies and a cover. The electrically conductive plate acts as a switch, such that the electrically conductive plate is electrically connected to each terminal contact assembly when in the ground (or normal) position, and the electrically conductive plate is electrically isolated from each terminal contact assembly when in the isolation position. The electrically conductive plate preferably has one end bent at an angle, e.g., substantially a right angle, to form an actuator or handle.

In another exemplary embodiment, the wiring device assembly includes a housing, an electrical switch, and at least one terminal contact assembly. The housing includes a base and a cover. The cover has a front face. The electrical switch is positioned at least partially within the housing and is selectively movable between a ground position and an isolation position. The at least one terminal contact assembly includes a stud portion and a clip portion. The stud portion is attached to the cover and extends out of the cover such that the stud portion is at least partially accessible from the front face of the cover. When the electrical switch is in the ground position, the electrical switch is in electrical contact with the clip portion of the at least one terminal contact assembly. And, when the electrical switch is in the isolation position, the electrical switch is electrically isolated from the clip portion of the at least one terminal contact assembly.

In another exemplary embodiment, the wiring device assembly includes a housing, an electrical switch, and a plurality of terminal contact assemblies. The housing includes a base and a cover. The cover has a front face. The electrical switch is positioned at least partially within the housing and is selectively movable between a ground position and an isolation position. Each of the plurality of terminal contact assemblies includes a stud portion and a clip portion. The stud portion is attached to the cover and extends out of the cover such that the stud portion is at least partially accessible from the front face of the cover. When the electrical switch is in the ground position, the electrical switch is in electrical contact with the clip portion of each of the plurality of terminal contact assemblies. And, when the electrical switch is in the isolation position, the electrical switch is electrically isolated from the clip portion of each of the plurality of terminal contact assemblies.

In another exemplary embodiment, the wiring device assembly includes a housing, an electrically conductive plate and a plurality of terminal contact assemblies. The housing having a front face. The electrically conductive plate is positioned within the housing. The electrically conductive plate is movable between a ground position and an isolation position. Each terminal contact assembly is positioned within the housing and at least partially extends from the front face of the housing. In this configuration when the electrically conductive plate is in the ground position, the electrically conductive plate is electrically connected to each terminal contact assembly, and when the electrically conductive plate is in isolation position, the electrically conductive plate is electrically isolated from each terminal contact assembly.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figures 1, 2:
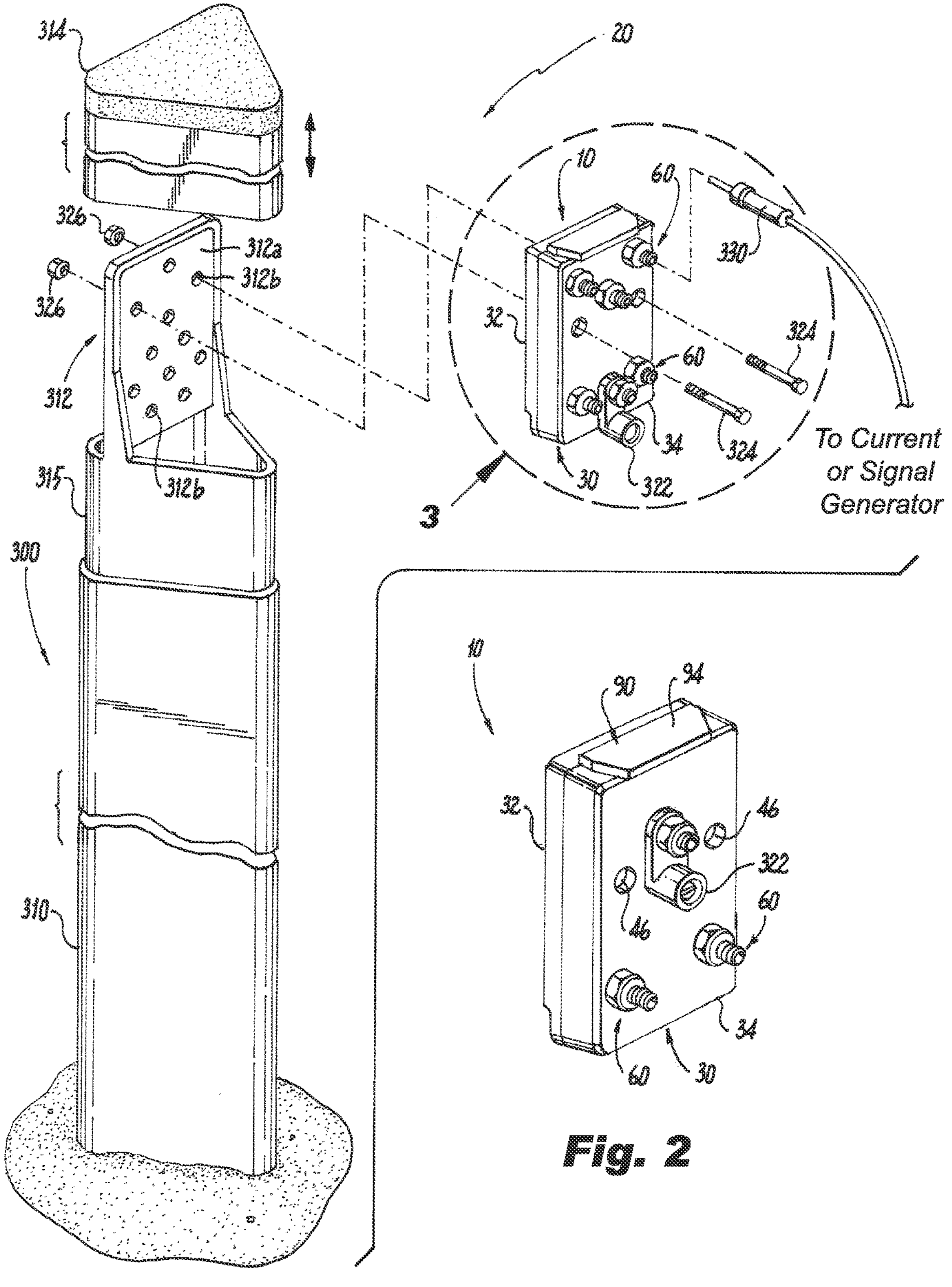
FIG. 1 is an exploded front perspective view of an exemplary embodiment of a test station assembly according to the present disclosure, illustrating a wiring device assembly according to the present disclosure mounted to an enclosure.
FIG. 2 is front perspective view of another exemplary embodiment of a wiring device assembly according to the present disclosure.

The present disclosure provides exemplary embodiments of wiring device assemblies 10 and test station assemblies 20 that include one or more wiring device assemblies. For ease of description, the wiring device assemblies 10 may also be referred to herein as the “device assemblies” in the plural and the “device assembly” in the singular. The test station assemblies 20 may be referred to herein as the “test stations” in the plural and the “test station” in the singular. The device assemblies 10 are configured to be mounted to an enclosure 300 to form the test station assembly 20. Non-limiting examples of the enclosures contemplated by the present disclosure include marker test stations, marker posts, and other structures capable of housing and supporting one or more underground tracer wires, e.g., electrical conductors. A non-limiting example of an enclosure 300 is the TriView® Test Station sold by Rhino Marking and Protection Systems of Bloomington, Minnesota. The enclosures are preferably made of a rigid, electrically non-conductive material, such as a thermoplastic material or a polycarbonate Lexan material. As a non-limiting example, the enclosure 300, shown in FIG. 1, is an elongated triangular shaped enclosure, having a main body 310, an enclosure mounting bracket 312 and a removable enclosure cover 314. The main body 310 is a hollow body with a triangular cross-section that can house an end portion of one or more underground tracer wires for connection to a wiring device assembly 10 mounted to the enclosure mounting bracket 312. The main body 310 is configured to be at least partially buried in the ground as shown. The enclosure mounting bracket 312 is configured and dimensioned to be mounted to the main body 310 by, for example, inserting a triangular shaped base 315 of the enclosure mounting bracket 312 into an open top end of the main body 310. The enclosure mounting bracket 312 has a substantially flat portion 312*a* on which the wiring device assembly 10 can be mounted, as shown in FIG. 1. The enclosures 300 provide a termination point for one or more underground tracer wires that are typically positioned adjacent or in close proximity to electrically non-conductive underground objects and are known in the art. Examples of electrically, non-conductive underground objects include plastic utility water, electric, gas and sewer pipes, cement sewer pipes and fiber optic cables.

Figure 7:
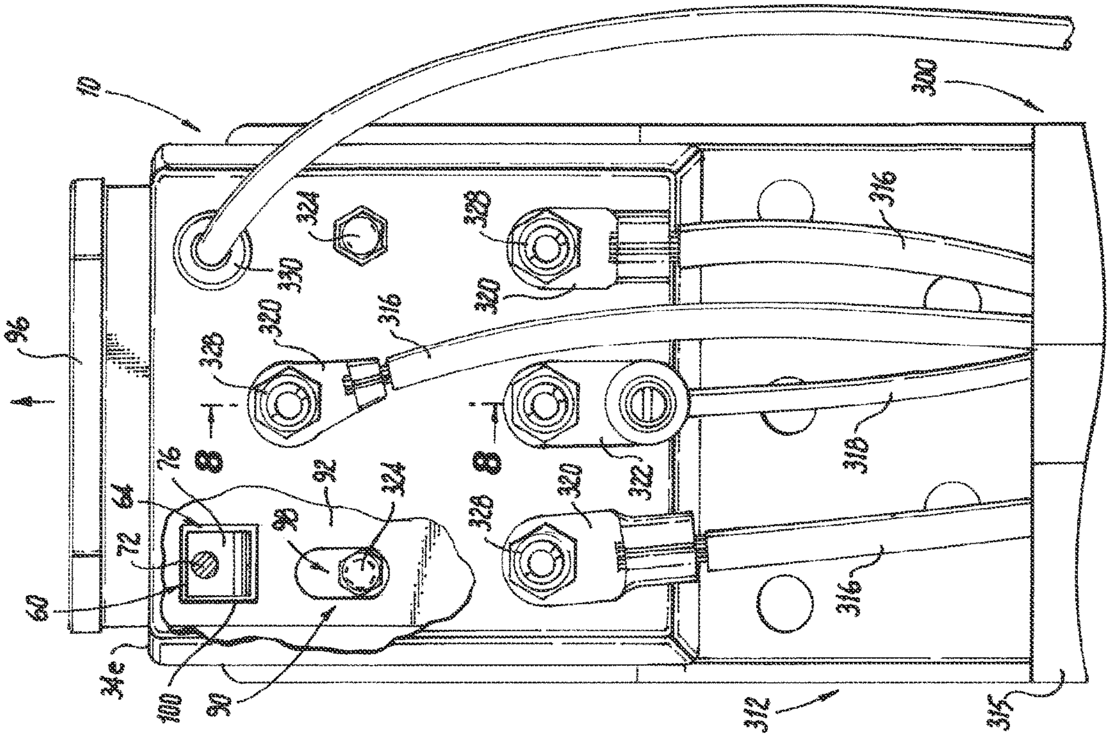
FIG. 7 is the enlarged front elevation view of a portion of the test station assembly of FIG. 6, illustrating the switch in an isolation position.
Figure 6:
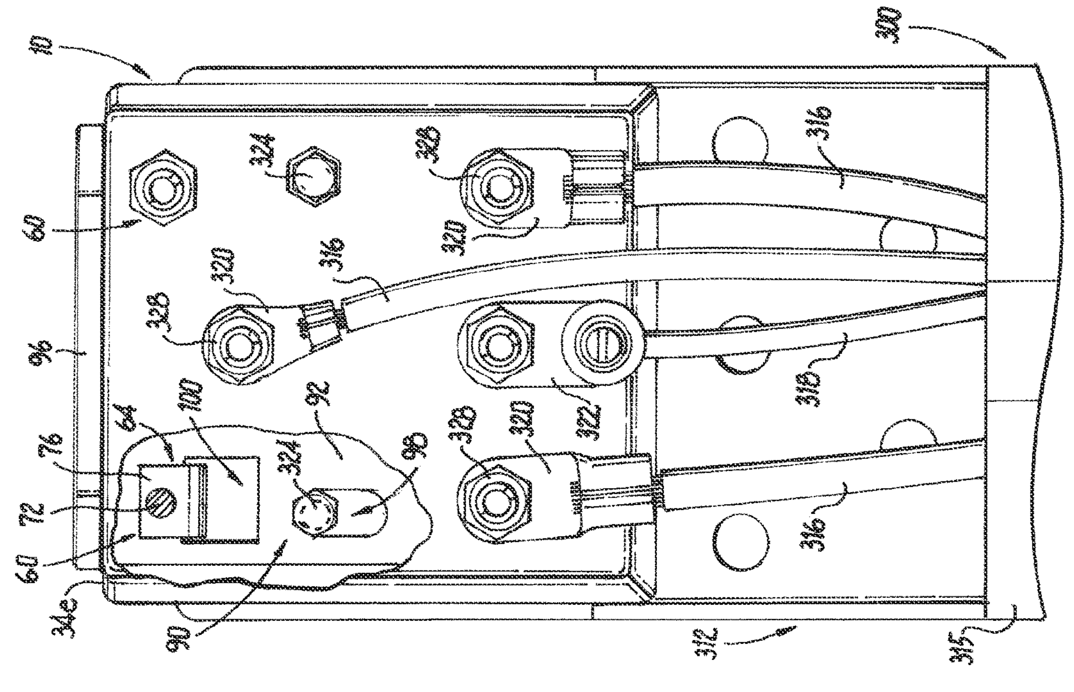
FIG. 6 is an enlarged front elevation view of a portion of the test station assembly of FIG. 1 in partial cut-away, illustrating the wiring device assembly mounted to an enclosure mounting bracket of the test station assembly with a switch of the wiring device assembly in a closed position.

The device assemblies 10 according to the present disclosure provide an efficient bi-stable switch that permits multiple tracer wires 316, e.g., electrical conductors or wires, seen in FIGS. 6 and 7 to be either concurrently connected to a ground wire 318 or to be concurrently isolated from the ground wire 318 so that an electrical current can be applied to one or more of the tracer wires 316 in order to detect the tracer wire and thus locate underground electrically non-conductive objects without having to disturb the ground, i.e., the soil.

The exemplary embodiments of the device assemblies according to the present disclosure are generally designated by the numeral 10. As will be described in more detail below, each device assembly 10 may include one or more terminal contact assemblies 60, seen in FIG. 3, adapted to permit one or more tracer wires 316 to be electrically connected to the device assemblies 10 using, for example, ring or spade type terminal connectors 320, seen in FIGS. 6 and 7. For ease of description, the terminal contact assemblies 60 may also be referred to herein as the “contact assemblies” in the plural and the “contact assembly” in the singular. Each device assembly 10 may also include a ground terminal connection 322, e.g., a ground lug, for connecting a ground wire 318 to the device assembly 10.

Figure 3:
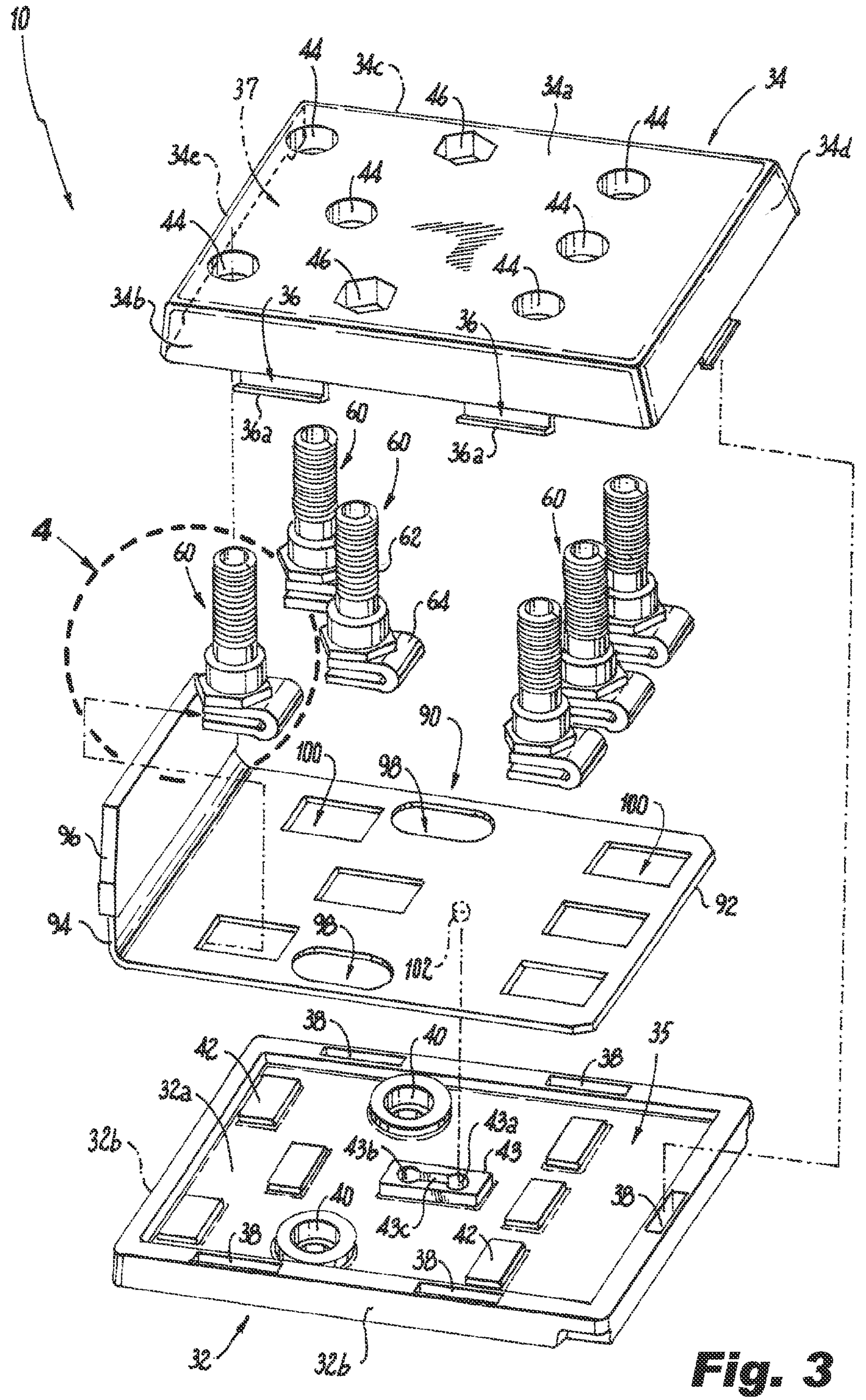
FIG. 3 is an exploded front perspective view of the wiring device assembly of FIG. 1, illustrating a base, a conductive plate, a plurality of terminal contact assemblies and a cover.

In the exemplary embodiment of FIGS. 1 and 3, the device assembly 10 includes a substantially square or rectangular housing 30, one or more contact assemblies 60 and a switch 90. The housing 30 has a base 32 and a cover 34, and is preferably formed from a rugged electrically non-conductive material, such as a 10% glass filled polycarbonate Lexan material. As seen in FIG. 3, the base 32 has a bottom wall 32*a* and a raised outer or peripheral wall 32*b* that creates a cavity 35 in the base 32. The base 32 has one or more slots 38 positioned along the outer or peripheral wall 32*b*. The one or more slots 38 are used when connecting the cover 34 to the base 32 as described below. The base 32 also includes one or more base mounting openings 40 used when securing the housing 30 to an enclosure mounting bracket, for example, the enclosure mounting bracket 312 seen in FIG. 1. The base 32 may also include one or more bosses or pads 42 extending from the bottom wall 32*a* of the base 32 into the cavity 35. The one or more bosses or pads 42 help maintain the position of the switch 90 within the housing 30, and help align the contact assemblies 60 with the switch 90 so that the switch can move, e.g., linearly or rotate, between a ground position and an isolation position, described in more detail below. The base 32 may also include an alignment boss 43 that is centered on the bottom wall 32*a* and includes two spaced apart openings 43*a* and 43*b* joined by a channel 43*c*. The alignment boss 43 interacted with the switch 90 to help align the switch with the base 32. The spaced apart openings 43*a*, 43*b* and channel 43*c* may also provide a tactile indication when the switch 90 is in the isolation position or the ground position.

Continuing to refer to FIG. 3, the cover 34 has a front face or wall 34*a*, side walls 34*b* and 34*c*, a bottom wall 34*d* and a top wall 34*e*. The front face 34*a*, side walls 34*b* and 34*c*, bottom wall 34*d* and the top wall 34*e* of the cover 34 form a hollow central portion in which to receive the switch 90 and at least a portion of the one or more contact assemblies 60. The front face 34*a* of the cover 34 includes one or more terminal openings 44 used when mounting the one or more contact assemblies 60 to the cover 34. The cover 34 also includes one or more cover mounting openings 46 that are positioned on the cover 34 so that the one cover mounting opening 46 is aligned with one base mounting openings 40. This alignment creates an aperture that extends through the housing 30. With each base mounting opening 40 aligned with a corresponding cover mounting opening 46 a bolt 324, seen in FIG. 1, of a mounting fastener can be passed through the housing 30 and an aperture 312*b* in an enclosure mounting bracket 312, and a nut 326 of the mounting fastener can be used to secure the bolt 324 and thus the housing 30 to the enclosure mounting bracket 312. In the exemplary embodiment of FIG. 1, the cover mounting openings 46 may include a hex shaped portion that is configured and dimensioned to receive a hex head of the bolt 324, seen in FIG. 1. The top wall 34*e* of the cover 34 includes a notch 37 through which a portion of the switch 90 passes, as described below.

The cover 34 may be permanently secured to the base 32 using for example adhesives or welds, e.g., sonic welds, or the cover 34 may be releasably secured to the base 32 via mechanical fasteners, a friction fit connection or a snap-fit connection. In the exemplary embodiment shown in FIG. 3, the cover 34 is releasable secured to the base 32 using a snap-fit connection. More specifically, the cover 34 has one or more resilient tabs 36 extending from the side walls 34*b* and 34*c*, and/or the bottom wall 34*d* in a direction away from the respective wall, as shown in FIG. 3. The one or more resilient tabs 36 are configured to fit within the one or more slots 38 spaced along the outer or peripheral wall 32*b* of the base 32 so that ledges 36*a*, seen in FIG. 3, on the one or more resilient tabs 36 grab the outer or peripheral wall 32*b* of the base 32 to releasably secure the cover 34 to the base 32.

It is noted that the housing 30 made be made of different colors, e.g., blue, orange, yellow, brown, depending upon the particular use or application. To illustrate, if the one or more tracer wires 316 are laid alongside electrically non-conductive, underground gas pipes or lines, the housing 30 may be a yellow housing to reflect the tracer wires are associated with gas pipes.

Figure 4:
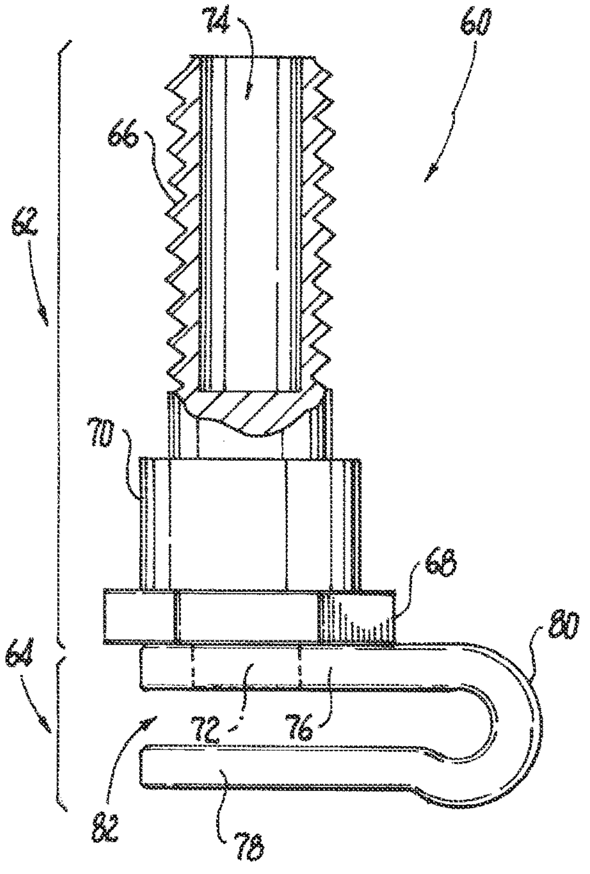
FIG. 4 is a side elevation view in partial cut-away of an exemplary embodiment of a terminal contact assembly according to the present disclosure.
Figure 5:
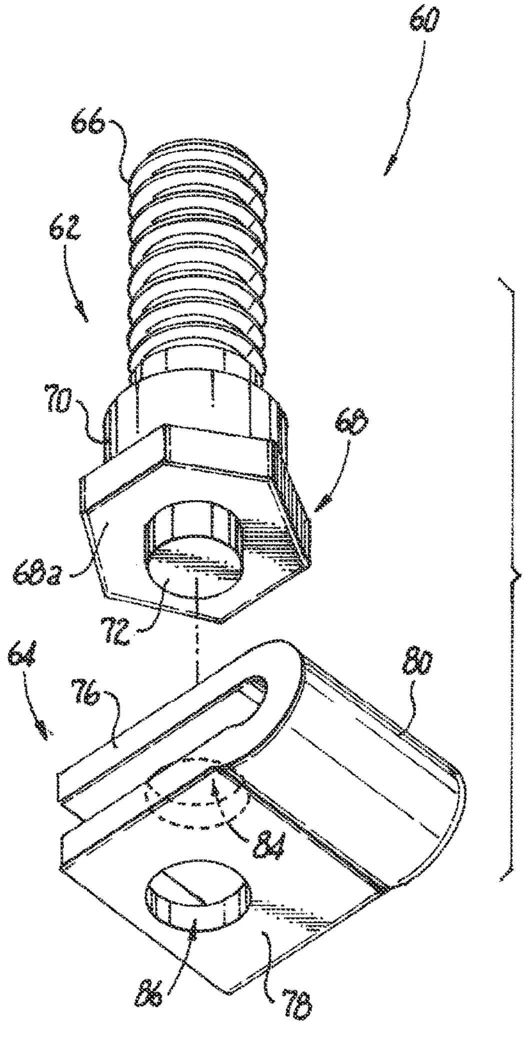
FIG. 5 is an exploded perspective view of the terminal contact assembly of FIG. 4, illustrating a stud portion and a contact portion of the terminal contact assembly.

Referring now to FIGS. 3-5, an exemplary embodiment of a contact assembly 60 according to the present disclosure is shown. Each contact assemblies 60 is preferably made of an electrically conductive material, such as brass, aluminum or copper. Each contact assembly 60 includes a stud portion 62 and a clip portion 64. For ease of description, the stud portion 62 may also be referred to herein as the "stud" and the clip portion 64 may also be referred to herein as the "clip." The stud 62 of each contact assembly 60 extends through one of the terminal openings 44 in the front face 34*a* of the cover 34. In the exemplary embodiment shown, the stud 62 includes a threaded portion 66, a hex collar 68 and a mounting collar 70 between the threaded portion 66 and the hex collar 68. In the embodiment shown, the mounting collar 70 has an outer diameter that is greater than a diameter of the threaded portion 66. Preferably, the outer diameter of the mounting collar 70 is slightly greater than a diameter of the one or more terminal openings 44 in the cover 34 so that when the mounting collar 70 is pressed into the terminal opening 44 a press-fit connection is made between the stud 62 and the terminal opening 44. Preferably, the outer diameter of the hex collar 68 is greater than the outer diameter of the mounting collar 70 so that the hex collar 68 acts as a stop for limiting how far the stud 62 extends through the terminal opening 44 in the cover 34. On a top side 68*a* of the hex collar 68 is a mounting tab 72 used to attach the stud 62 to the clip 64 with, for example, a press fit. The threaded portion 66 of the stud 62 may include a hollow central portion 74 configured and dimensioned to receive a terminal connector of a wire operatively connected to current or signal generator (not shown) used to apply a current to one or more tracer wires 316 connected to the contact assembly 60. A non-limiting example of such a terminal connector is a banana jack 330, seen in FIGS. 1 and 7.

Continuing to refer to FIGS. 3-5, the clip 64 of the contact assembly 60 is preferably a U-shaped member having two opposing arms 76 and 78 and a back pad 80. The back pad 80 joins the first arm 76 to the second arm 78 so that a receiving zone 82, e.g., a channel, is formed between the arms 76 and 78. The receiving zone 82 is configured and dimensioned to receive at least a portion of the switch 90 as described below. Each arm 76 and 78 may include a lead-in (not shown) that may be a rounded edge or other type of lead-in that facilitates easy entry of the switch 90 between the opposing arms 76 and 78.

Referring again to FIG. 3, the switch 90 is positioned within the housing 30 between the base 32 and the cover 34 so that the switch 90 can move, e.g., linearly or rotate, between the ground position, seen in FIG. 6, and the isolation position, seen in FIG. 7. The switch 90 is made of an electrically conductive material that is sufficiently rigid to withstand repetitive movement between the ground position and the isolation position, and to create an electrical continuity path between the switch 90 and the clip 64 of the contact assembly 60 when in the ground position. Non-limiting examples of such electrically conductive materials include brass, aluminum and copper. Preferably, the switch 90 is made of brass.

In the exemplary embodiment shown in FIG. 3, the switch 90 is a plate 92 configured and dimensioned to move, e.g., linearly or rotate within the housing 30 as described herein. One end of the plate 92 has a handle 94 that is preferably at an angled relative to the plate 92. For example, the handle 94 may be substantially at a right angle relative to the plate 92. The handle 94 may be part of the plate 92 and bent to the desired angle or the handle 94 may be secured to the plate 92 using mechanical fasteners, welds or adhesives. In the exemplary embodiment shown in FIG. 3, the handle 94 is to remain outside the housing 30 while a majority of the plate 92 is within the housing. In this exemplary embodiment, a portion of the plate 92 adjacent the handle 94 extends through notch 37 in the cover 34. The handle 94 is provided to help a technician move the switch 90 between the ground position and the isolation position. At least a portion of the handle portion 94 may be covered with a gripping member 96 made of, for example, a rubber material that can improve a technician's grip on the handle 94 when moving the switch 90 to the ground position or to the isolation position.

Figure 8:
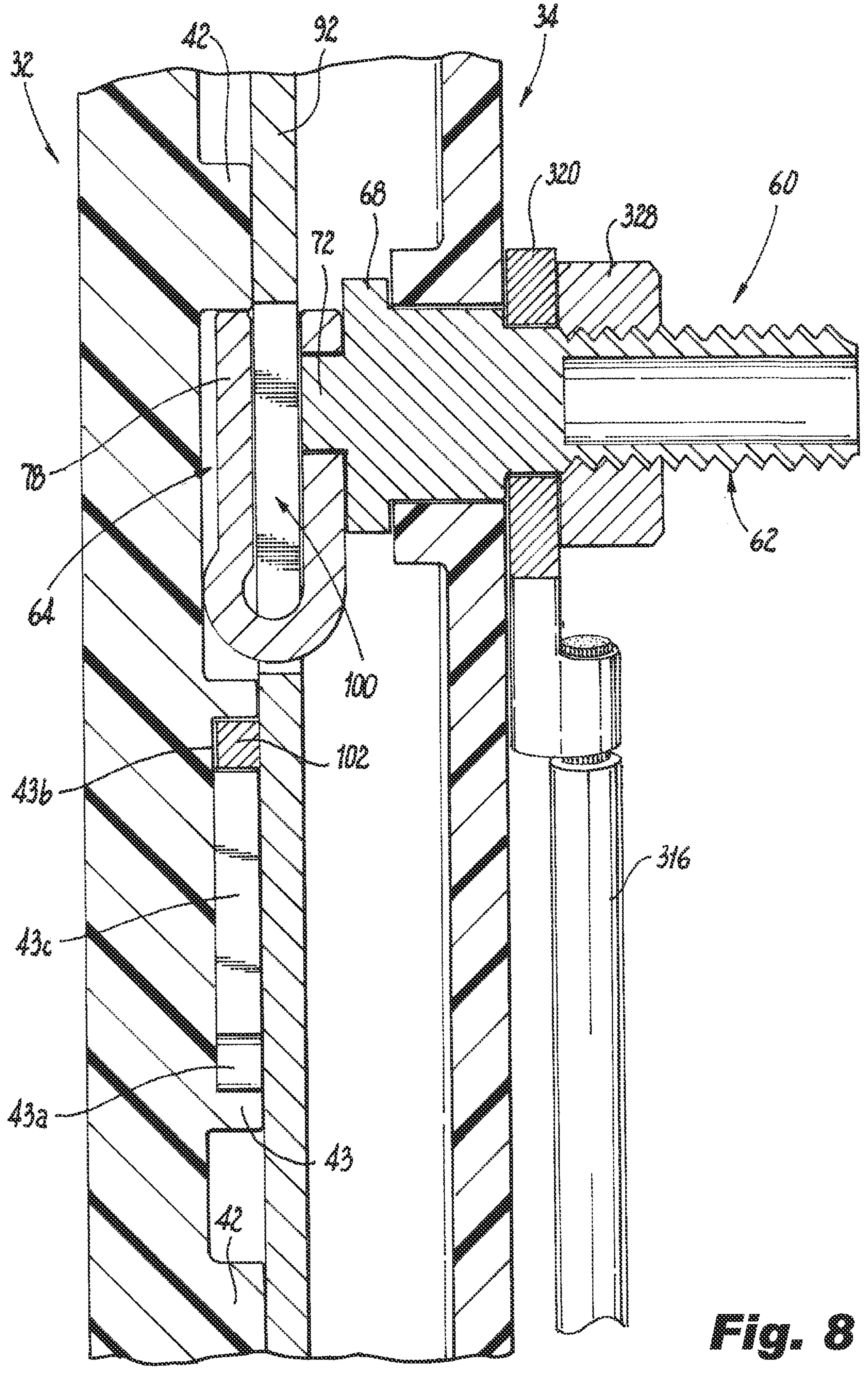
FIG. 8 is a cross-sectional view of a portion of the wiring device assembly of FIG. 7 taken along line 8-8, illustrating the alignment of a terminal contact assembly of the wiring device assembly within a housing of the wiring device assembly.

Continuing to refer to FIG. 3, the switch 90 includes one or more oblong slots 98 that are generally aligned with the one or more base mounting openings 40 and with the one or more cover mounting openings 46. In the embodiment shown, the switch 90 includes a pair of laterally spaced oblong slots 98, the base 32 includes a pair of base mounting openings 40 and the cover 34 includes a pair of cover mounting openings 46, where one base mounting opening 40, one cover mounting opening 46 and one slot 98 are aligned. The switch 90 also includes one or more clip openings 100. The clip openings 100 may be substantially identically shaped clip openings 100 or they may be different size openings. The clip openings 100 are configured and dimensioned to receive the clip 64 of the contact assembly 60 so that the clip 64 does not contact the plate 92 of the switch 90, as seen in FIG. 7. The clip openings 100 generally align with the cavity 35 in the base 32 so that the second arm 78 of the clip 64 can extend below the plate 92 of the switch 90 into the cavity 35, as shown in FIG. 8. The switch 90 also include an alignment pin 102 that is aligned to interact with the alignment boss 43 that is centered on the bottom wall **32*a* of the base 32. In the exemplary embodiment shown, the alignment pin 102 fits within aperture openings 43*a* or 43*b* of the alignment boss 43 when in the ground position or the isolation position, and when the switch 90 is moved from one position to the other position, the alignment pin 102 slides through the channel 43*c* in the alignment boss 43. The channel 43*c* may have a width that is slightly less that a diameter of the alignment pin 102 so that when the alignment pin 102 exits the channel 43*c* the technician feels the release of the force needed to move the alignment pin 102 along the channel 43*c*. Thus, providing a tactile indication when the switch 90** is in the ground position or the isolation position.

Referring now to FIGS. 6 and 7, when in the ground position where the handle 94 of the switch 90 is adjacent the top wall **34*e* of the cover 34, seen in FIG. 6, a portion of the plate 92 of the switch 90 is positioned between and in contact with the first arm 76 and the second arm 78 of the clip 64 of each contact assembly 60 so that an electrically conductive path is created between the arms the 76 and 78 and the plate 92. And, when in the isolation position where the handle 94 of the switch 90 is away from the top wall 34*e* of the cover 34, seen in FIG. 7, the clip 64 of each contact assembly 60 is positioned within one of the clip openings 100 so that the clip 64 does not contact and is electrically isolated from the plate 92 of the switch 90. It is noted that the bolt 324 of each mounting fastener may also act as a stop to limit the sliding movement of the plate 92 of the switch 90 between the ground position and the isolation position. For example, when the switch 90 is in the ground position, the bolt 324 of the mounting fastener may contact one end of the slot 98, seen in FIG. 6, and when the switch 90 is in the isolation position, the bolt 324 of the mounting fastener may contact the other end of the slot 98, seen in FIG. 7**.

Operation of the device assembly 10 will be described with reference to FIGS. 6-8. Prior to use of the device assembly 10, one or more tracer wires 316 are secured to one or more of the contact assemblies 60 using, for example, a ring termination connector 320 and a nut 328 threaded onto the stud 62. A ground wire 318 is attached to the ground terminal connection 322. With the electrical connections made, the enclosure cover 314 is placed onto the enclosure mounting bracket 312 enclosing the device assembly 10 within the enclosure 300. The device assembly 10 can now be used. The device assembly 10 is initially placed in the ground position, seen inf FIG. 6, such that all tracer wires 316 are electrically connected to the ground wire 318 via the contact assembly 60 and the plate 92 of the switch 90. To apply a current to one or more tracer wires 316, a technician would grip the handle 94 of the switch 90 and move the switch 90 to the isolation position, seen in FIG. 7, such that the clip 64 of each contact assembly 60 is within its respective clip openings 100, seen in FIGS. 7 and 8, thus electrically isolating the contact assemblies 60 from plate 92 of the switch 90. In the embodiments shown, the handle 94 causes the switch 90 to move linearly between the ground position and the isolation position. However, the present disclosure contemplates that the handle can be configured to rotate to move the switch 90 between the ground position and the isolation position. The technician would then attach, for example, a banana jack 330 that is operatively connected to a current or signal generator (not shown) to one of the contact assemblies 60. A current can then be applied by the current generator to the one or more tracer wires 316 connected to the particular contact assembly 60. It will be appreciated that the tracer wires 316 can be electrically isolated from the electrical ground in an efficient manner and without disconnecting the other tracer wires 316 from the device assembly 10. After a current is applied to the one or more tracer wires 316, the relevant tracer wire or wires 316 can be located in the ground, i.e., the soil, and marked, by for example, flags stuck in the ground. The technician can then remove the banana jack 330 from the contact assembly 60 and move the handle 94 of the switch 90 back to the ground position thus bonding all the tracer wires 316 connected to the device assembly 10. The technician can then place the enclosure cover 314 on the enclosure mounting bracket 312 to fully enclose the device assembly 10 in the enclosure 300.

Figure 9:
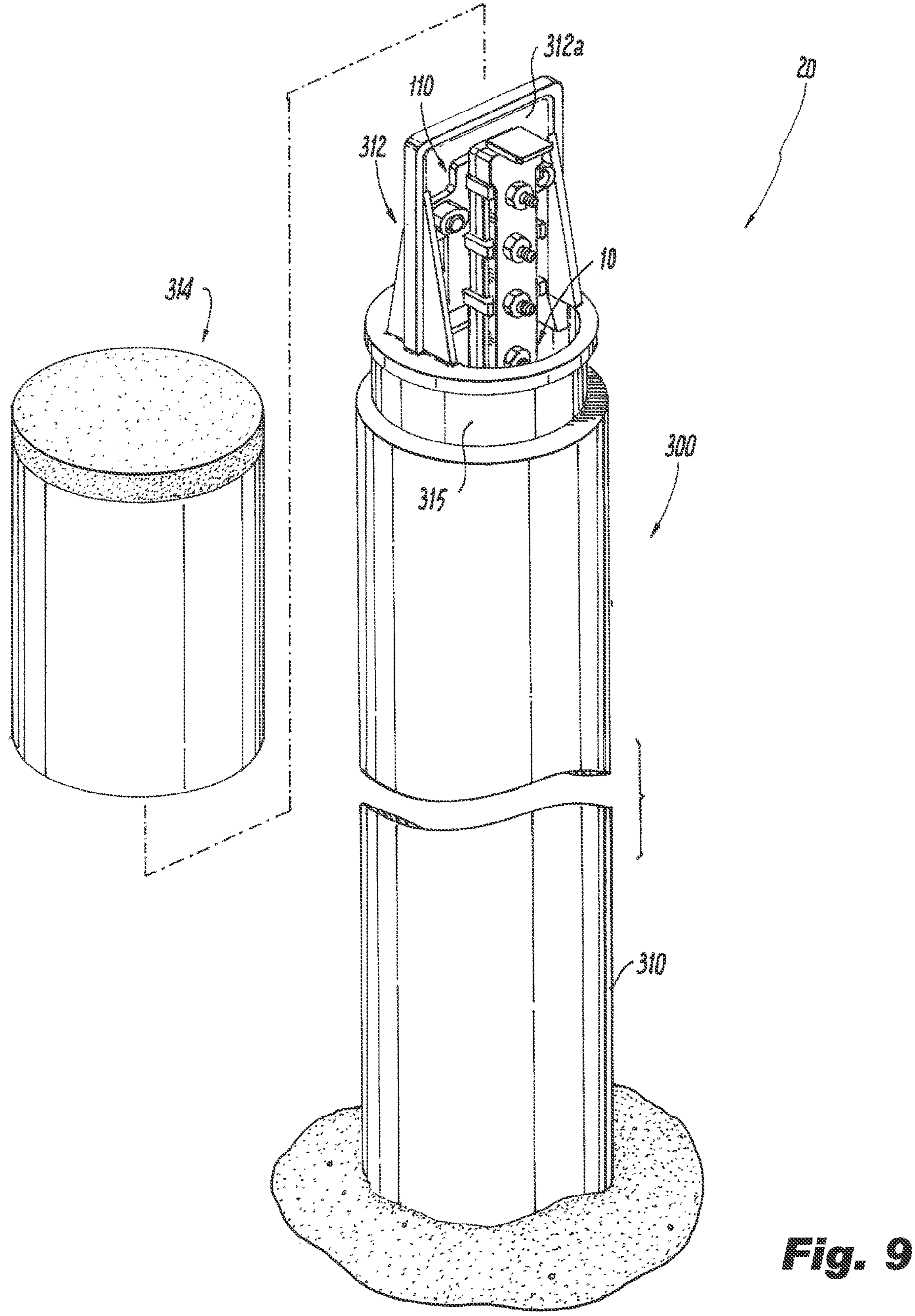
FIG. 9 is a front perspective view of another exemplary embodiment of a test station assembly according to the present disclosure, illustrating another exemplary embodiment of a wiring device assembly mounted to an enclosure.
Figure 10:
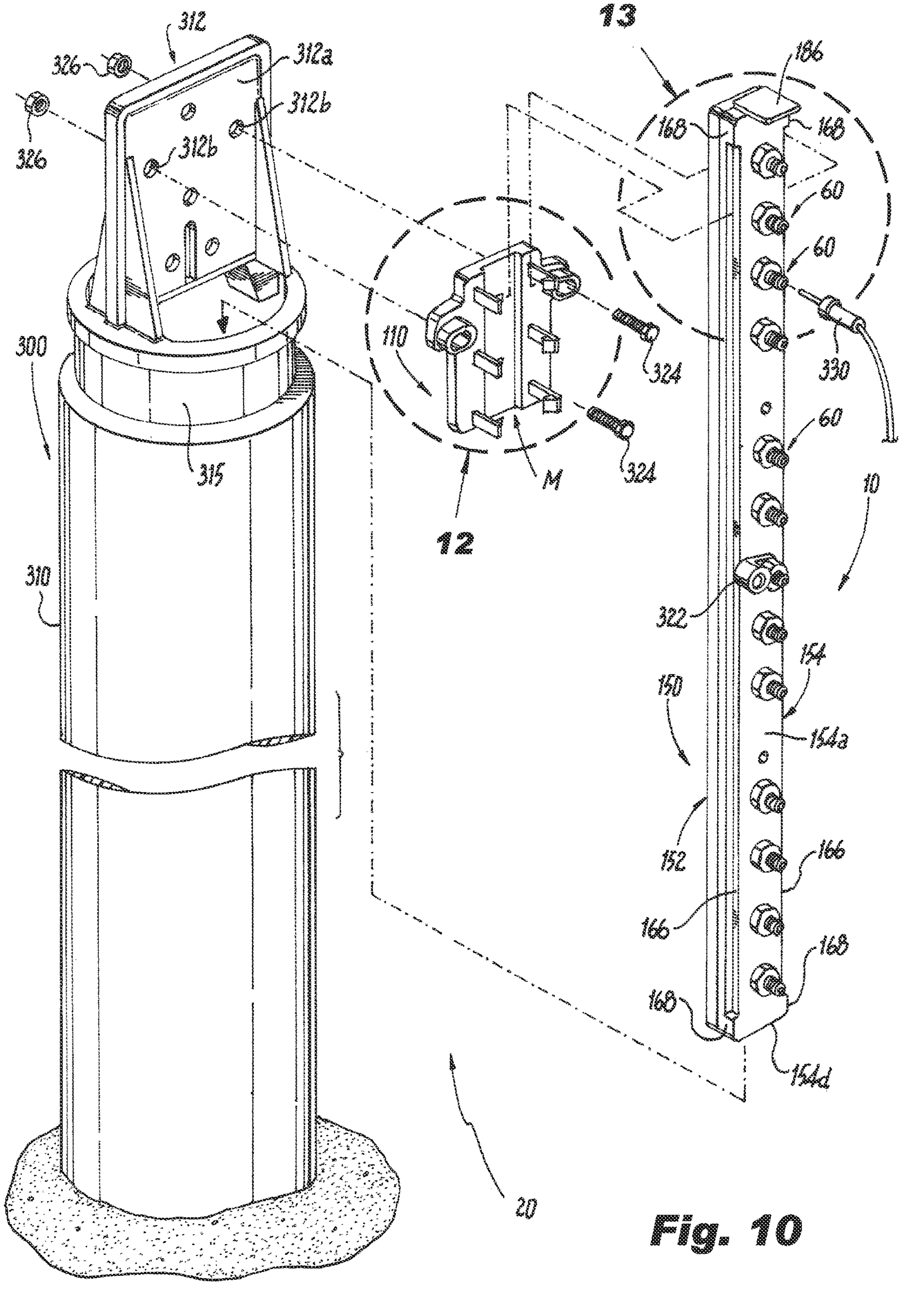
FIG. 10 is an exploded front perspective view of the test station assembly and enclosure of FIG. 9, illustrating the wiring device assembly attached to a device mounting bracket and the device mounting bracket attached to an enclosure mounting bracket.

Referring now to FIGS. 9 and 10, another exemplary embodiment of a test station 20 according to the present disclosure is shown. In this exemplary embodiment, the enclosure 300 is an elongated cylindrical enclosure having a main body 310, an enclosure mounting bracket 312 and a removable enclosure cover 314. The main body 310 is a substantially hollow body with a circular cross-section that can house an end portion of one or more underground tracer wires 316 for connection to a wiring device assembly 10 mounted to the enclosure mounting bracket 312. The main body 310 is configured to be at least partially buried in the ground as shown. The enclosure mounting bracket 312 is configured and dimensioned to be mounted to the main body 310 by, for example, inserting a cylindrical base 315 of the enclosure mounting bracket 312 into an open top end of the main body 310. The enclosure mounting bracket 312 has a substantially flat portion 312*a* on which a device mounting bracket 110 can be mounted. As described above, the enclosures 300 provide a termination point for one or more underground tracer wires 316 that are typically positioned adjacent or in close proximity to electrically non-conductive underground objects and are known in the art.

Figure 11:
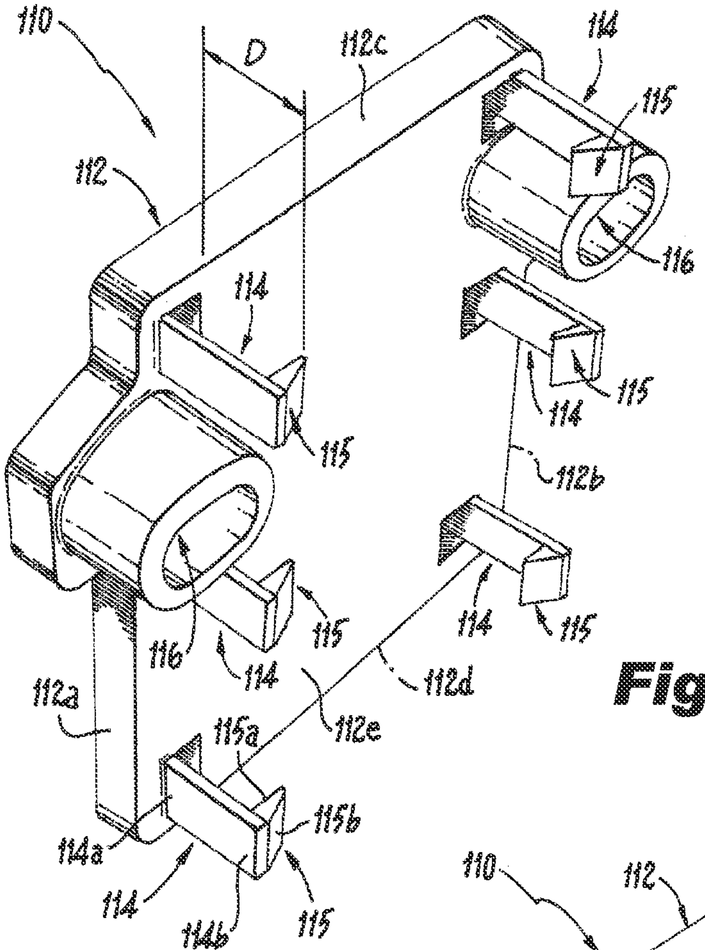
FIG. 11 is a perspective view of an exemplary embodiment of the device mounting bracket of FIG. 9.
Figure 12:
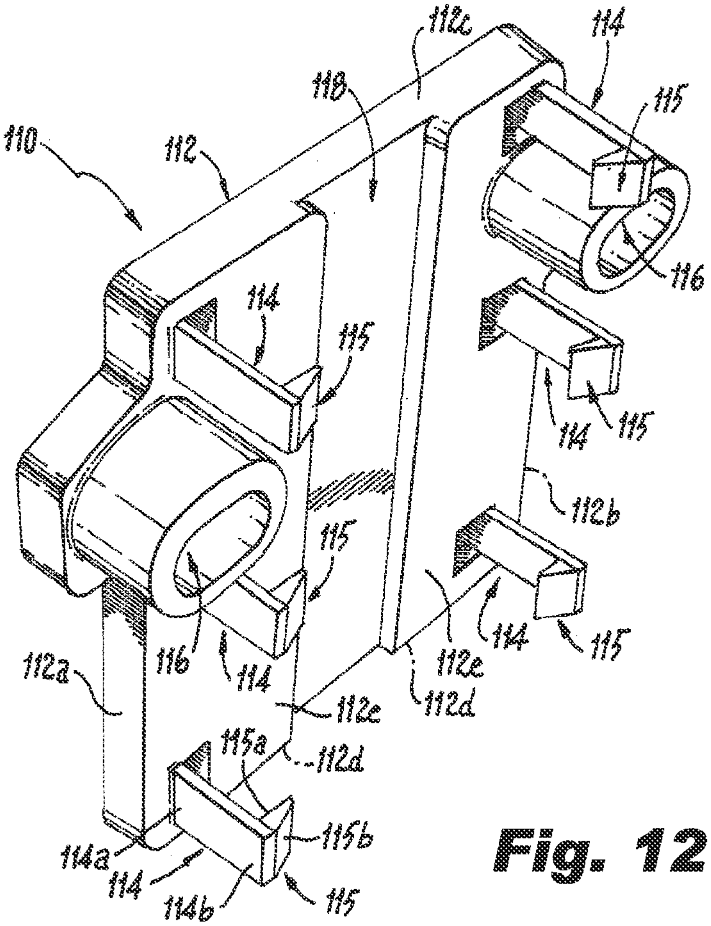
FIG. 12 is a perspective view of another exemplary embodiment of the device mounting bracket of FIG. 9.
Figure 16:
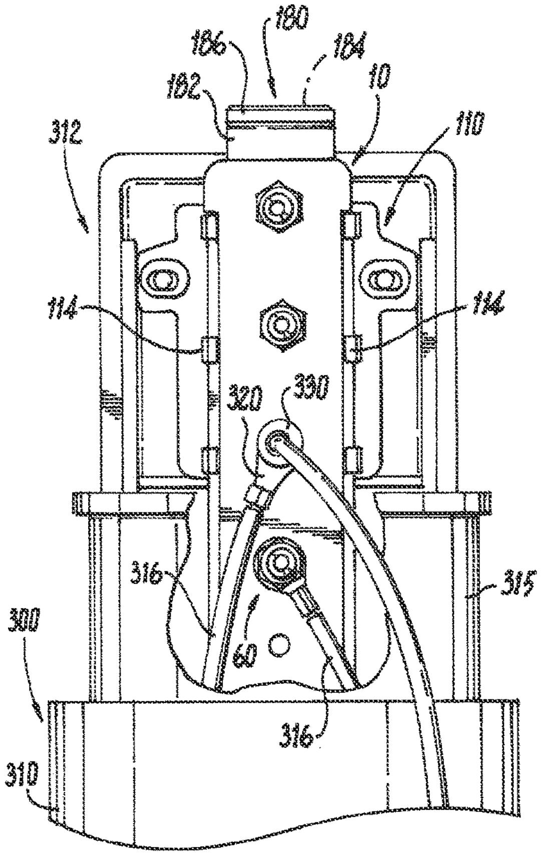
FIG. 16 is a front elevation view of a portion of the test station assembly of FIG. 9, illustrating the wiring device assembly in the retracted position.
Figure 17:
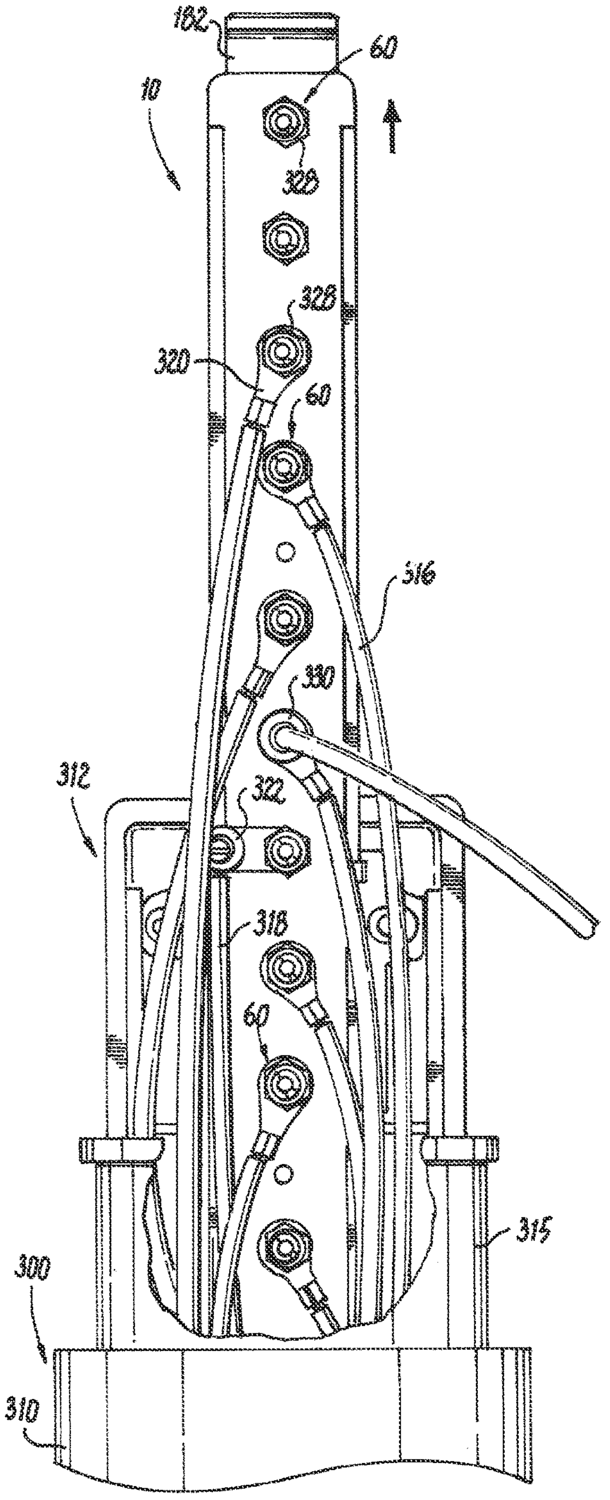
FIG. 17 is a front elevation view of the portion of the test station assembly of FIG. 16, illustrating the wiring device assembly in an extended position.

Referring to FIGS. 10-12, the device mounting bracket 110 is configured and dimensioned for attachment to the substantially flat portion 312*a* of the enclosure mounting bracket 312 using for example, mounting fasteners, e.g., threaded bolts 324 and nuts 326, seen in FIG. 1. In addition, the device mounting bracket 110 is configured and dimensioned so that a device assembly 10 can be releasably attach thereto so that the device assembly 10 can move, e.g., slide along, the device mounting bracket 110 between a normal retracted position and an extended position while still attached to the device mounting bracket 110. In the retracted position, the device assembly 10 is at least partially within the main body 310 of the enclosure 300, as shown in FIG. 16. In the extended position, the device assembly 10 is extending from the main body 310 of the enclosure 300 so that all contact assemblies 60 in the device assembly 10 are accessible, as shown in FIG. 17. Exemplary embodiments of device mounting brackets 110 to which a device assembly 10 according to the present disclosure can be attached so that device assembly 10 can be moved between a retracted position and an extended position are shown in FIGS. 11 and 12. In the exemplary embodiment of FIG. 11, the device mounting bracket 110 includes a bracket base 112, one or more resilient arms 114 and one or more mounting holes 116. The device mounting bracket 110 is preferably made of an electrically non-conductive material, such as a thermoplastic material. In this exemplary embodiment shown, the bracket base 112 may be a substantially solid base with side walls 112*a* and 112*b*, a top wall 112*c*, a bottom wall 112*d* and a substantially flat top surface 112*e*. In another exemplary embodiment shown in FIG. 12, the bracket base 112 may be a hollow base formed by the side walls 112*a* and 112*b*, the top wall 112*c*, the bottom wall 112*d* and the substantially flat top surface 112*e*. However, in this exemplary embodiment, the substantially flat top surface 112*e* may include a channel 118 that extends from the top wall 112*c* to the bottom wall 112*d* and is substantially centered on the top surface 112*e*, as shown. The channel 118 may be used to permits any tabs or bosses extending from a base 152 of the device assembly 10 to freely slide along the top surface 112*e* of the bracket brace 112.

In the exemplary embodiments shown in FIGS. 11 and 12, each of the one or more resilient arms 114 are spaced apart preferable adjacent side walls 112*a* and 112*b* of the bracket base 112. Preferably, there is one resilient arm 114 adjacent one side wall 112*a* and a corresponding resilient arm 114 adjacent the opposite side wall 112*b* so that the resilient arms 114 oppose each other as shown. Each resilient arm 114 has a first end 114*a* and a second end 114*b*. The first end 114*a* is attached to the bracket base 112 so that it is fixed in position relative to the bracket base. The second free end 114*b* extends from the bracket base 112 a predefined distance "D." The second end 114*b* includes an ear or ledge 115 extending therefrom in a direction toward a center of the bracket base 112, as shown. The ear or ledge 115 includes a substantially flat lower side 115*a* and a tapered or ramped upper side 115*b*. The substantially flat lower side 115*a* is configured and dimensioned to engage a track 166 of the cover 154, seen in FIG. 13, of a housing 150, seen in FIG. 10, of the device assembly 10, described in more detail below. The tapered or ramped upper side 115*b* is provided as a lead-in facilitating easy attachment of the device assembly 10 to the device mounting bracket 110, as described below. The predefined distance "D" is sufficient so that the ear 115 of each free end 114*b* can grip and hold the device assembly 10 while permitting the device assembly 10 to move between the retracted position and the extended position. Having the second end 114*b* the predefined distance "D" away from the first end 114*a* permits the second end 114*b* to flex when attaching a device assembly 10 to the device mounting bracket 110.

Figure 13:
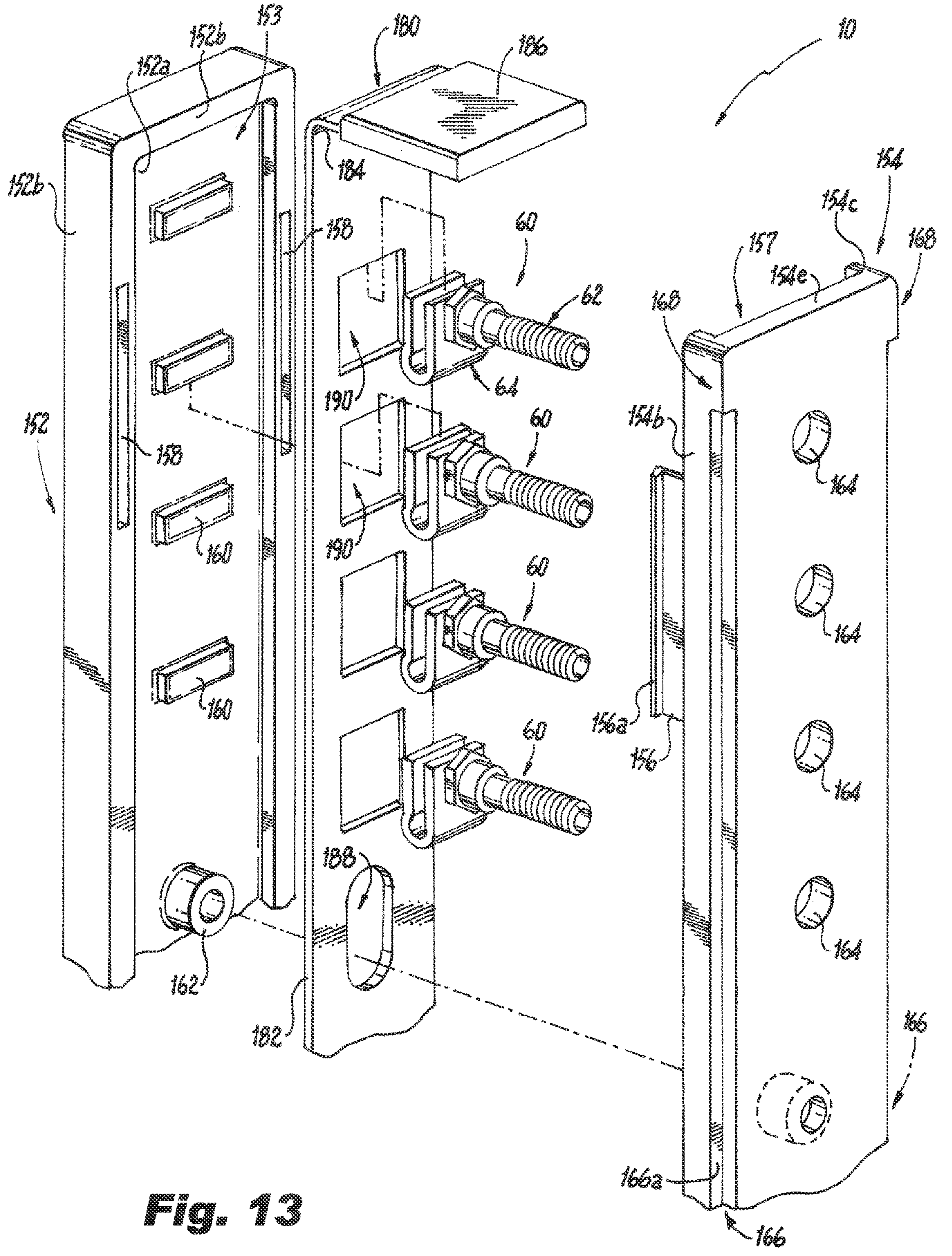
FIG. 13 is an exploded front perspective view of as portion of the wiring device assembly of FIG. 9, illustrating a base, a conductive plate, a plurality of terminal contact assemblies and a cover.

Referring now to FIG. 13, another exemplary embodiment of the device assemblies 10 according to the present disclosure is shown. In this exemplary embodiment, each device assembly 10 includes an elongated rectangular housing 150, one or more contact assemblies 60 and a switch 180. The one or more contact assemblies 60 were described above and are not repeated. The housing 150 has a base 152 and a cover 154, and is preferably formed from a rugged electrically non-conductive material, such as a 10% glass filled polycarbonate Lexan material. As seen in FIG. 13, the base 152 has a bottom wall 152*a* and an outer or peripheral wall 152*b* that has a portion that is raised above the bottom wall 152*a* to create a cavity 153 in the base 152. The cavity 153 permits at least a portion of the clip 64 of the contact assembly 60 to extend below plate 182 of the switch 180. The base 152 has one or more slots 158 positioned along the outer or peripheral wall 152*b*. The one or more slots 158 are used when connecting the cover 154 to the base 152 as described below. The base 152 may also include one or more bosses or pads 160 extending from the bottom wall 152*a* of the base 152 into the cavity 153. The one or more bosses or pads 160 help maintain the position of the switch 180 within the housing 150, and help align the contact assemblies 60 with the switch 180 so that the switch can move, e.g., linearly or rotate, between the ground position and the isolation position. The base 152 may also include one or more alignment bosses 162 used to align the plate 182 of the switch 180 with the housing 150 and to act as a stop to limit the sliding movement of the plate 182 as described below.

Continuing to refer to FIG. 13, the cover 154 has a front face or wall 154*a*, side walls 154*b* and 154*c*, a bottom wall 154*d* (seen in FIG. 10) and a top wall 154*e*. The front face 154*a*, side walls 154*b* and 154*c*, bottom wall 154*d* and the top wall 154*e* of the cover 154 form a hollow central portion in which to receive the switch 180 and at least a portion of the one or more contact assemblies 60. The front face 154*a* of the cover 154 includes one or more terminal openings 164 used when mounting the one or more contact assemblies 60 to the cover 154. The cover 154 also includes a track 166 on each side wall 154*b* and 154*c*. In the embodiment shown, the track 166 is an elongated notch or channel having a substantially flat surface 166*a* extending substantially along a length of the side walls 154*b* and 154*c*. However, the track 166 may include multiple track segments spaced along the side walls 154*b* and 154*c*. Further, the track may come in many different configurations, such as a channel having a well to receive a hook. In the exemplary embodiment shown, the track 166 is a substantially a flat surface configured and dimensioned to contact the substantially flat lower side 115*a* of the ear or ledge 115 of the resilient arms 114 to firmly hold the housing 150 against the top surface 112*e* of the device mounting bracket 110 and prevent the device assembly 10 from being removed from the device mounting bracket 110. As seen in FIGS. 10, 11 and 13, the track 166 ends before reaching the bottom wall 154*d* and the top wall 154*e* forming stops 168 at the end of each side wall 154*b* and 154*c*. The stops 168 are provided to prevent the device assembly 10 from sliding out of the device mounting bracket 110 when the device assembly is moved between the retracted position and the extended position. The top wall 154*e* of the cover 154 includes a notch 157 through which the switch 180 passes as described below.

The cover 154 may be permanently secured to the base 152 using for example adhesives or welds, e.g., sonic welds, or the cover 154 may be releasably secured to the base 152 via mechanical fasteners, a friction fit connection or a snap-fit connection. In the exemplary embodiment shown in FIG. 13, the cover 154 is releasable secured to the base 152 using a snap-fit connection. More specifically, the cover 154 has one or more resilient tabs 156 extending from the side walls 154*b* and 154*c*, and/or the bottom wall 154*d* in a direction away from the respective wall, as shown in FIG. 13. The one or more resilient tabs 156 are aligned with and configured to fit within the one or more slots 158 spaced along the outer or peripheral wall 152*b* of the base 152 so that ears or ledges 156*a*, seen in FIG. 13, on the one or more resilient tabs 156 grab the outer or peripheral wall 152*b* of the base 152 to releasably secure the cover 154 to the base 152. The housing 150 may be made of different colors, e.g., blue, orange, yellow, brown, depending upon the particular use or application. To illustrate, if the one or more tracer wires 316 are laid alongside electrically non-conductive, underground gas pipes or lines, the housing 150 may be a yellow housing to reflect the tracer wires 316 are associated with gas pipes.

Figure 14:
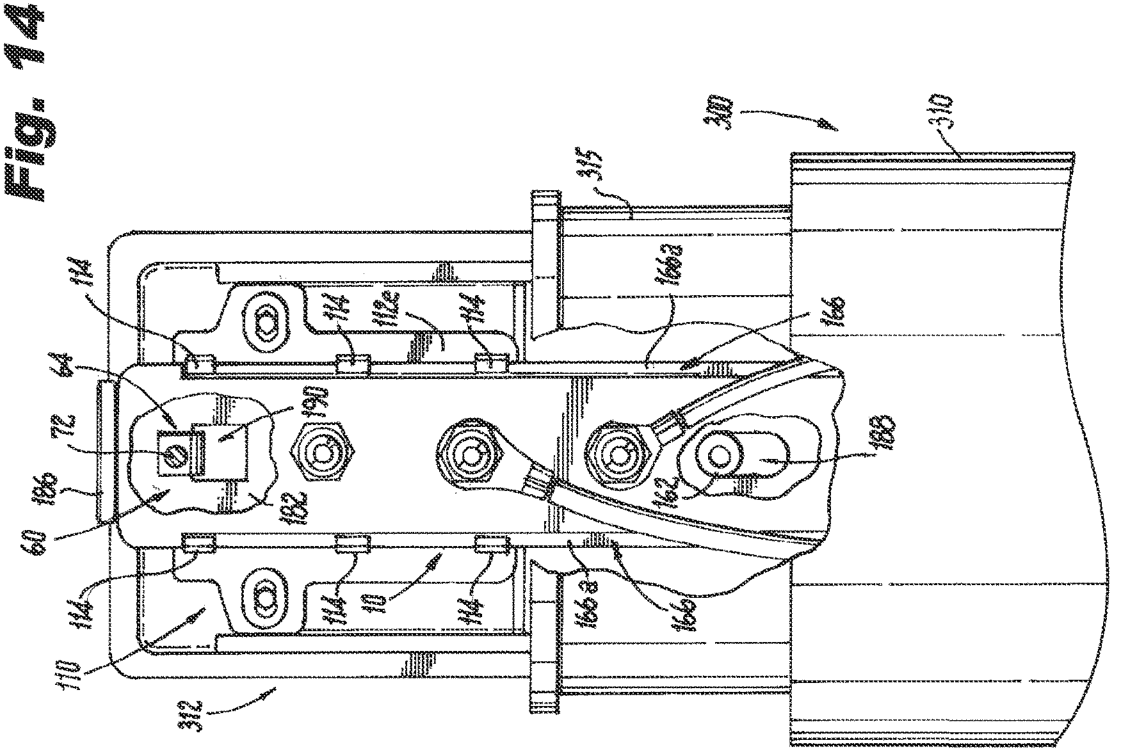
FIG. 14 is an enlarged front elevation view of a portion of the test station assembly of FIG. 9 in partial cut away, illustrating the wiring device assembly attached to the device mounting bracket and the device mounting bracket attached to the enclosure mounting bracket with the wiring device assembly housed within the enclosure and a switch in a closed position.

Referring again to FIG. 13-15, the switch 180 is positioned within the housing 150 between the base 152 and the cover 154 so that the switch 180 can move, e.g., linearly or rotate, between the ground position, seen in FIG. 14, and the isolation position, seen in FIG. 15. The switch 180 is made of an electrically conductive material that is sufficiently rigid to withstand repetitive movement between the ground position and the isolation position, and to create an electrical continuity path between the switch 180 and the clip 64 of the contact assembly 60 when in the ground position. Non-limiting examples of such electrically conductive materials include brass, aluminum and copper. Preferably, the switch 180 is made of brass.

In the exemplary embodiment shown in FIG. 13, the switch 180 is a plate 182 configured and dimensioned to slide within the housing 150 as described herein. One end of the plate 182 has a handle 184 that is preferably at an angled relative to the plate 182. For example, the handle 184 may be substantially at a right angle relative to the plate. The handle 184 may be part of the plate 182 and bent to the desired angle or the handle 184 may be secured to the plate 182 using mechanical fasteners, welds or adhesives. In the exemplary embodiment shown in FIG. 13, the handle 184 is to remain outside the housing 150 through notch 157 in the cover 154 while a majority of the plate 182 is within the housing. In this exemplary embodiment, a portion of the plate 92 adjacent the handle 94 extends through the notch 157 in the cover 154. The handle 184 is provided to help a technician move the switch 180 between the ground position and the isolation position. At least a portion of the handle portion 184 may be covered with a gripping member 186 made of, for example, a rubber material that can improve a technician's grip on the handle 184 when moving the switch 180 to the ground position or to the isolation position.

Figure 15:
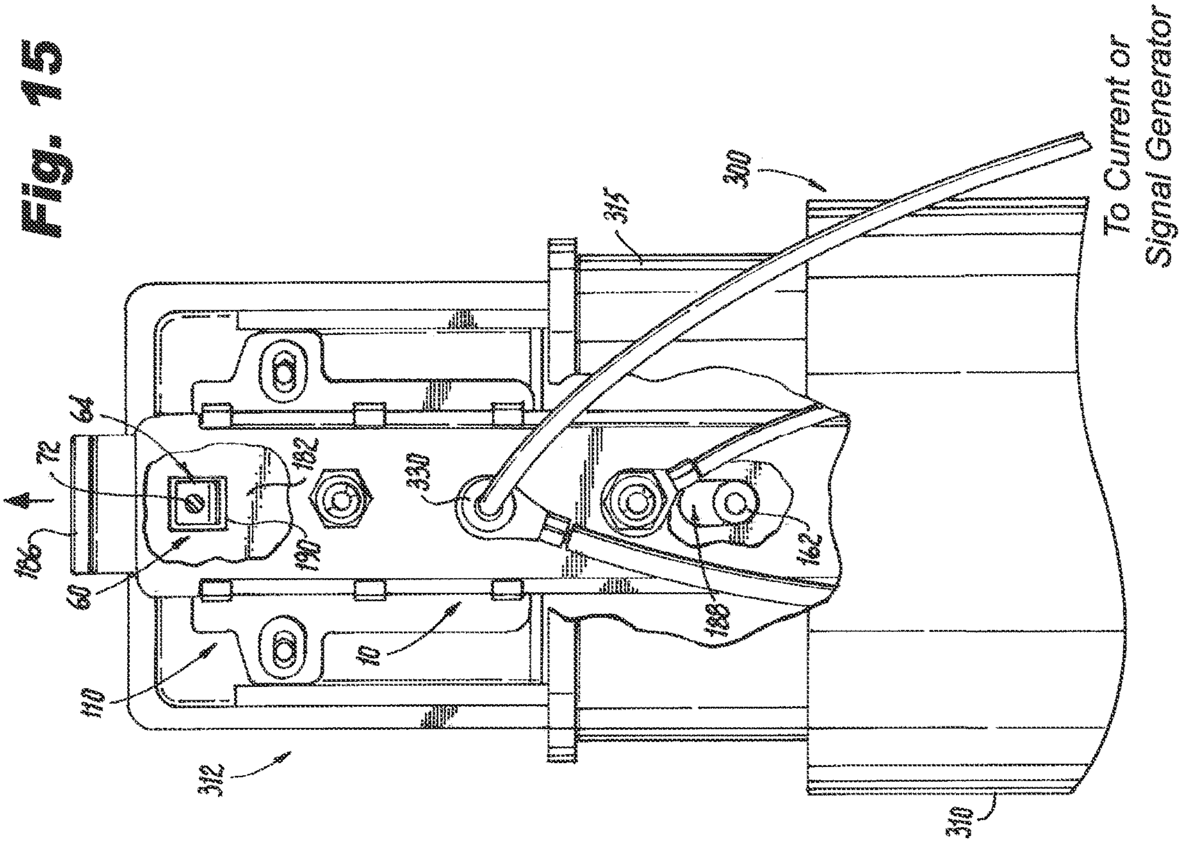
FIG. 15 is the enlarged front elevation view of a portion of the test station assembly of FIG. 9, illustrating the switch in an isolation position.

Continuing to refer to FIG. 13, the switch 180 includes one or more oblong slots 188 that are generally aligned with the one or more alignment bosses 162 extending from the bottom wall 152*a* of the base 152. The switch 180 also includes one or more clip openings 190. The clip openings 190 may be substantially identically shaped clip openings 190 or they may be different size openings. The clip openings 190 are configured and dimensioned to receive the clip 64 of the contact assembly 60 so that the clip 64 does not contact the plate 182 of the switch 180, as seen in FIG. 15. The clip openings 190 generally align with the cavity 153 in the base 152 so that the second arm 78 of the clip 64 of the contact assembly 60 can extend below the plate 182 of the switch 180, similar to that shown in Fig.

Referring again to FIGS. 13, 14 and 15, when in the ground position where the handle 184 of the switch 180 is adjacent the top wall 154*e* of the cover 154, seen in FIG. 14, a portion of the plate 182 of the switch 180 is positioned between and in contact with the first arm 76 and the second arm 78 of the clip 64 of each contact assembly 60 so that an electrically conductive path is created between the arms the 76 and 78 and the plate 182. And, when in the isolation position where the handle 184 of the switch 180 is away from the top wall 154*e* of the cover 154, seen in FIG. 15, the clip 64 of each contact assembly 60 is positioned within one of the clip openings 190 so that the clip 64 does not contact and is electrically isolated from the plate 182 of the switch 180. As noted above, the boss 162 extending from the base 152 passes through the slot 188 in the plate 182 and acts as a stop to limit the sliding movement of the plate 182 of the switch 180 between the ground position and the isolation position. For example, when the switch 180 is in the ground position, the boss 162 may contact one end of the slot 188, and when the switch 180 is in the isolation position, the boss 162 may contact the other end of the slot 188.

Installation of the device assembly 10 to the test station 20, will be described with reference to FIG. 10. Initially, a device assembly 10 is releasably attached to the device mounting bracket 110 by aligning the device assembly 10 with the center portion "M" of the device mounting bracket 110 so that the base 152 of the device assembly 10 is in contact with the ramped surface 115*b* of the resilient arm 114. Pressure or a force is then applied to the cover 154 of the device assembly 10 in a direction toward the top surface 112*e* of the base 112 of the device mounting bracket 110. The pressure applied in the direction of the bracket base 112 of the device mounting bracket 110 causes the housing 150 to slide along the ramped surface 115*b* of each resilient arm 114 causing the resilient arms 114 to flex outwardly—away from a center portion "M" of the device mounting bracket 110. Flexing the arms 114 outwardly permits the housing 150 to pass into the center portion "M" of the device mounting bracket 110 until the substantially flat lower side 115*a* of the ear or ledge 115 of the resilient arms 114 contacts the substantially flat surface 166*a* of the track 166 in the cover 154. With the substantially flat lower side 115*a* of the ear or ledge 115 in contact with the substantially flat surface 166*a* of the track 166 the resilient arms 114 firmly hold the housing 150 against the top surface 112*e* of the bracket base 112. Thus, the ears or ledges 115 of the resilient arms 114 prevent the device assembly 10 from being removed, e.g., pulled away, from the device mounting bracket 110 while permitting the device assembly 10 to slide between the retracted position and the extended position. The device mounting bracket 110 holding the device assembly 10 is then positioned against the flat portion 312*a* of the enclosure mounting bracket 312 and secured to the enclosure mounting bracket 312 using one or more mounting fasteners, e.g., bolt 324 and nut 326, as shown in FIG. 10. Prior to use of the device assembly 10, one or more tracer wires 316 are secured to one or more of the contact assemblies 60 using, for example, a ring termination connector 320 and a nut 328 threaded onto the stud 62 of the contact assemblies 60. A ground wire 318, seen in FIG. 17, is attached to the ground terminal connection 322. The device assembly 10 is initially placed in the ground position, seen inf FIG. 14, such that all tracer wires 316 are electrically connected to the ground wire 318 via the contact assemblies 60 and the plate 182 of the switch 180. With the electrical connections made and the device assembly 10 in the ground position, the enclosure cover 314 is placed onto the enclosure mounting bracket 312 enclosing the device assembly 10 within the enclosure 300.

Operation of the device assembly 10 of FIGS. 9-13 will be described with reference to FIGS. 14-17. A technician removes the enclosure cover 314 and slides the device assembly 10 from the retracted position, out of the main body 310 and enclosure mounting bracket 312 of the enclosure 300 to either a partial extended position or fully extended position, seen in FIG. 17. To apply a current to one or more tracer wires 316, the technician would grip the handle 184 of the switch 180 and move the switch to the isolation position, seen in FIG. 15, such that the clip 64 of each contact assembly 60 is within its respective clip openings 190 thus electrically isolating the contact assemblies 60 from plate 182 of the switch 180. In the embodiment shown, the handle 184 causes the switch 180 to move linearly between the ground position and the isolation position. However, the present disclosure contemplates that the handle can be configured to rotate to move the switch 180 between the ground position and the isolation position. The technician would then attach, for example, a banana jack 330 that is operatively connected to a current or signal generator (not shown) to one of the contact assemblies 60. A current can then be applied by the current generator to the one or more tracer wires 316 connected to the particular contact assembly 60. It will be appreciated that the tracer wires 316 can be electrically isolated from the electrical ground in an efficient manner and without disconnecting the other tracer wires 316 from the device assembly 10.

After a current is applied to the one or more tracer wires 316, the relevant tracer wire or wires 316 can be located in the ground, i.e., the soil, and marked by, for example, flags stuck in the ground. The technician can then remove the banana jack 330 from the contact assembly 60 and move the handle 184 of the switch 180 back to the ground position thus bonding all the tracer wires 316 connected to the device assembly 10. The technician can the slide the device assembly 10 from the fully or partially extended position to the retracted and place the enclosure cover 314 back onto the enclosure mounting bracket 312 to fully enclose the device assembly 10 in the enclosure 300.

As used in this application, the terms “front,” “rear,” “upper,” “lower,” “upwardly,” “downwardly,” and other orientational descriptors are intended to facilitate the description of the exemplary embodiments of the present invention, and are not intended to limit the structure of the exemplary embodiments of the present invention to any particular position or orientation. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A wiring device assembly comprising:

a housing having a base and a cover, the cover having a front face;

an electrical switch positioned at least partially within the housing, the electrical switch includes at least one opening and is selectively movable between a ground position and an isolation position; and at least one terminal contact assembly having a stud and a clip, the stud includes a first portion, a second portion and a third portion, and the clip includes a first arm, a second arm and a backpad joining the first arm to the second arm;

wherein the first portion of the stud is attached to an interior of the front face of the cover, wherein the second portion of the stud extends from the front face of the cover, and wherein the third portion of the stud extends from the first portion such that at least a portion of the third portion is within the housing; and wherein the first arm of the clip is secured to the third portion of the stud by a press fit connection so that the clip remains fixed relative to the stud and is configured to fit within the at least one opening such that when the electrical switch is in the isolation position the first and second arms do not contact the electrical switch, and when the electrical switch is in the ground position the first and second arms contact the electrical switch.

2. The wiring device assembly according to claim 1, wherein the electrical switch moves linearly between the ground position and the isolation position.

3. The wiring device assembly according to claim 1, wherein the electrical switch has a handle extending through the housing such that the handle is accessible from outside the housing.

4. The wiring device assembly according to claim 1, wherein the electrical switch comprises an electrically conductive plate, and wherein one end of the electrically conductive plate extends through the housing and is bent at an angle to form a handle.

5. The wiring device assembly according to claim 1, wherein the second portion of the stud of the at least one terminal contact assembly comprises a threaded portion that extends from the front face of the housing.

6. The wiring device assembly according to claim 1, wherein the third portion of the stud includes a tab extending therefrom and the first arm of the clip includes an aperture configured to receive the tab to form the press fit connection.

7. A wiring device assembly comprising:

a housing having a base and a cover, the cover having a front face;

an electrical switch positioned at least partially within the housing, the electrical switch includes a plurality of clip openings and is selectively movable between a ground position and an isolation position; and a plurality of terminal contact assemblies, each terminal contact assembly having a stud and a clip, the stud includes a first portion, a second portion and a third portion, and the clip includes a first arm, a second arm and a backpad joining the first arm to the second arm so that a receiving zone is formed between the first and second arms;

wherein the first portion of the stud is attached to an interior of the front face of the cover, wherein the second portion of the stud extends from the front face of the cover, and wherein the third portion of the stud extends from the first portion such that at least a portion of the third portion is within the housing; and wherein the first arm of the clip is secured to the third portion of the stud by a press fit connection so that the clip remains fixed relative to the stud and is configured to fit within one of the plurality of clip openings such that when the electrical switch is in the isolation position the first and second arms do not contact the electrical switch, and when the electrical switch is in the ground position the receiving zone of the clip is aligned to receive the electrical switch so that the first and second arms contact the electrical switch.

8. The wiring device assembly according to claim 7, wherein the third portion of the stud includes a tab extending therefrom and the first arm of the clip includes an aperture configured to receive the tab to form the press fit connection.

9. The wiring device assembly according to claim 7, wherein the electrical switch moves linearly between the ground position and the isolation position.

10. The wiring device assembly according to claim 7, wherein the electrical switch has a handle extending through the housing such that the handle is accessible from outside the housing.

11. The wiring device assembly according to claim 7, wherein the electrical switch comprises an electrically conductive plate, and wherein one end of the electrically conductive plate extends through the housing and is bent at an angle to form a handle.

12. The wiring device assembly according to claim 7, wherein the second portion of the stud of each of the plurality of terminal contact assemblies comprises a threaded portion that extends from the front face of the housing.

13. A wiring device assembly comprising:

a housing having a front face;

an electrically conductive plate positioned within the housing, the electrically conductive plate having a plurality of clip openings and being movable between a ground position and an isolation position; and a plurality of terminal contact assemblies, each terminal contact assembly includes a stud and a clip, the stud includes a first portion, a second portion and a third portion, and the clip includes a first arm, a second arm and a backpad joining the first arm to the second arm;

wherein at least the first portion of the stud is secured to an interior of the front face of the housing, wherein the second portion of the stud extends from the front face of the housing, and wherein the third portion of the stud extends from the first portion such that at least a portion of the third portion is within the housing; and wherein the first arm of the clip is secured to the third portion of the stud by a press fit connection so that the clip remains fixed relative to the stud and is configured to fit within one of the plurality of clip openings such that when the electrically conductive plate is in the isolation position the first and second arms do not-contact the electrically conductive plate, and when the electrically conductive plate is in the ground position the first and second arms contact the electrically conductive plate.

14. The wiring device assembly according to claim 13, wherein the third portion of the stud includes a tab extending therefrom and the first arm of the clip includes an aperture configured to receive the tab to form the press fit connection.

15. The wiring device assembly according to claim 13, wherein the electrically conductive plate is linearly movable between the ground position and the isolation position.

16. The wiring device assembly according to claim 13, wherein the electrically conductive plate has a handle extending through the housing such that the handle is accessible from outside the housing.

17. The wiring device assembly according to claim 16, wherein one end of the electrically conductive plate extends through the housing and is bent at an angle to form the handle.

18. The wiring device assembly according to claim 13, wherein one of the plurality of clip openings is associated with one of the plurality of terminal contact assemblies, and wherein each clip opening is configured to receive at least the second arm of the associated terminal contact assembly when the electrically conductive plate is in the isolation position.

19. The wiring device assembly according to claim 13, wherein the second portion of the stud of each of the plurality of terminal contact assemblies comprises a threaded portion that extends from the front face of the housing.

* * * * *